(12) United States Patent
Kim et al.

(10) Patent No.: US 11,926,513 B2
(45) Date of Patent: Mar. 12, 2024

(54) UP-AND-DOWN DRIVING DEVICE

(71) Applicant: HUVITZ CO., LTD., Gyeonggi-do (KR)

(72) Inventors: Chang Sung Kim, Gyeonggi-do (KR); Young Woo Lee, Gyeonggi-do (KR)

(73) Assignee: HUVITZ CO., LTD., Gyeonggi-Do (KR)

( * ) Notice: Subject to any disclaimer, the term of this patent is extended or adjusted under 35 U.S.C. 154(b) by 435 days.

(21) Appl. No.: 17/328,841

(22) Filed: May 24, 2021

(65) Prior Publication Data

US 2021/0371257 A1  Dec. 2, 2021

(30) Foreign Application Priority Data

May 26, 2020  (KR) .................. 10-2020-0062957

(51) Int. Cl.
*B66F 3/10* (2006.01)
*F16F 3/04* (2006.01)

(52) U.S. Cl.
CPC .............. *B66F 3/10* (2013.01); *F16F 3/04* (2013.01); *F16F 2228/06* (2013.01)

(58) Field of Classification Search
CPC .......... B66F 3/10; B66F 3/08; B66F 2700/04; F16F 3/04; H02K 7/1166; H02K 33/02
See application file for complete search history.

(56) References Cited

U.S. PATENT DOCUMENTS

2022/0316550 A1* 10/2022 Jang .................. F16F 3/04

FOREIGN PATENT DOCUMENTS

| CN | 207375673 U | 5/2018 |
|---|---|---|
| KR | 10-1223959 B1 | 1/2013 |
| KR | 10-2019-0079090 A | 7/2019 |

OTHER PUBLICATIONS

Constant Tension Buffer Mechanism Based on Hinge Zero-rigidity Spring; Document ID: CN 114838074 B; Date Published: Aug. 18, 2023; Inventor: Zhang Hai-bing, Chen Liang, Liu Guo-Hua (Year: 2022).*

(Continued)

*Primary Examiner* — Mahdi H Nejad
(74) *Attorney, Agent, or Firm* — Nath, Goldberg & Meyer; Joshua B. Goldberg

(57) ABSTRACT

An up-and-down driving device allows an up-and-down driving unit to move while supporting an object's load, in a support module in which the up-and-down driving unit is movably inserted into an inner space of a fixed housing. The up-and-down driving device includes: a driving means for moving the up-and-down driving unit in an up-and-down direction; a fixed-position compression spring main module including a fixed-position compression spring having one side fixed to a lower end of the housing and the other side supporting the up-and-down driving unit and mounted in a motion direction of the up-and-down driving unit; and a variable-position compression spring supplemental module including a variable-position compression spring having one side mounted rotatably to a side of the housing and the other side fastened rotatably to the up-and-down driving unit and configured to rotate while making a predetermined angle with the motion direction of the up-and-down driving unit.

7 Claims, 5 Drawing Sheets

(56) References Cited

OTHER PUBLICATIONS

With Quasi-zero Rigidity of Semi-active Control Type Vertical Vibration Isolator; Document ID: CN 106594172 B; Inventor: Wang, Xiao-jie (Year: 2019).*
Quasi-zero Rigidity Vibration Isolation Device With Automatic Adjustment of Balance Position; Document ID: CN 214063650 U; Inventor: Liu, Yan-qi; Date Published: Aug. 27, 2021 (Year: 2021).*
Quasi-zero Rigidity Vertical Vibration Isolator Capable of Adjusting Balance Position; Document ID: CN 111927912 A; Date Published: Nov. 13, 2020; Inventor: Xu, Xing (Year: 2020).*
Search Report received Dec. 2, 2021 issued in corresponding European Application No. 21175062.

* cited by examiner

UP-AND-DOWN DRIVING DEVICE

CROSS-REFERENCE TO RELATED APPLICATION

This application claims benefit of priority to Korean Patent Application No. 10-2020-0062957 filed on May 26, 2020, the entire contents of which are incorporated herein by reference.

FIELD OF THE DISCLOSURE

The present invention relates to an up-and-down driving device, and more particularly, to an up-and-down driving device comprising a driving means, a fixed-position compression spring main module, and a variable-position compression spring supplemental module.

BACKGROUND

In general, when moving an object with a driving device, a motor is used as a driving means. Driving devices for moving objects to be transferred using motors have been employed in industrial facilities in various industrial fields, conveyors in manufacturing processes, and the like. Further, in order to move an object to be transferred more precisely, a servo motor or a linear motor capable of precisely following a speed and a position according to commands is employed in such a driving device. A mechanical mechanism is coupled to such a driving device so that the object to be transferred can be moved by driving the motor, and the mechanical mechanism is driven by the rotation of the motor so that the object to be transferred can be transported to a desired position.

In the case of moving a heavy object to be transferred with a driving device using only the power of the motor, the size of the motor and the driving device needs to be increased. Therefore, compression springs are used to assist the power of the motor and to alleviate mechanical vibrations or shocks generated during transfer. However, there was a problem that since the elastic force differs depending on the length of compression springs, the resultant force between the compression spring and the motor exerted on the object to be transferred varies, thereby causing the driving device to be unable to stably move the object to be transferred.

SUMMARY OF THE INVENTION

Technical Objects

It is an object of the present invention to provide an up-and-down driving device for supplementing the up-and-down movement of an object using a combination of a fixed-position compression spring main module and a variable-position compression spring supplemental module as a driving means.

Technical Solution

In order to achieve the object above, the present invention provides an up-and-down driving device configured to allow an up-and-down driving unit 150 to move while supporting the load of an object, in a support module 90 in which the up-and-down driving unit 150 is movably inserted into an inner space of a fixed housing 120, the up-and-down driving device comprising: a driving means configured to move the up-and-down driving unit 150 in an up-and-down direction; a fixed-position compression spring main module 100 comprising a fixed-position compression spring 130 having one side fixed to a lower end of the housing 120 and the other side supporting the up-and-down driving unit 150 and mounted in a motion direction of the up-and-down driving unit 150; and a variable-position compression spring supplemental module 200 comprising a variable-position compression spring 250 having one side mounted rotatably to a side of the housing 120 and the other side fastened rotatably to the up-and-down driving unit 150 and configured to rotate while making a predetermined angle with the motion direction of the up-and-down driving unit 150.

Effects of the Invention

According to the up-and-down driving device in accordance with the present invention, it is possible to implement a stable operation of the up-and-down driving device with a combination of the fixed-position compression spring main module and the variable-position compression spring supplemental module when it is necessary to implement the up-and-down movement of an object with the driving means in a place where space is insufficient.

In addition, it is possible to preclude the driving means from being overloaded by automatically changing the elastic force of the variable-position compression spring supplemental module in response to the position of the fixed-position compression spring main module.

DETAILED DESCRIPTION OF THE PREFERRED EMBODIMENTS

Figure 1:
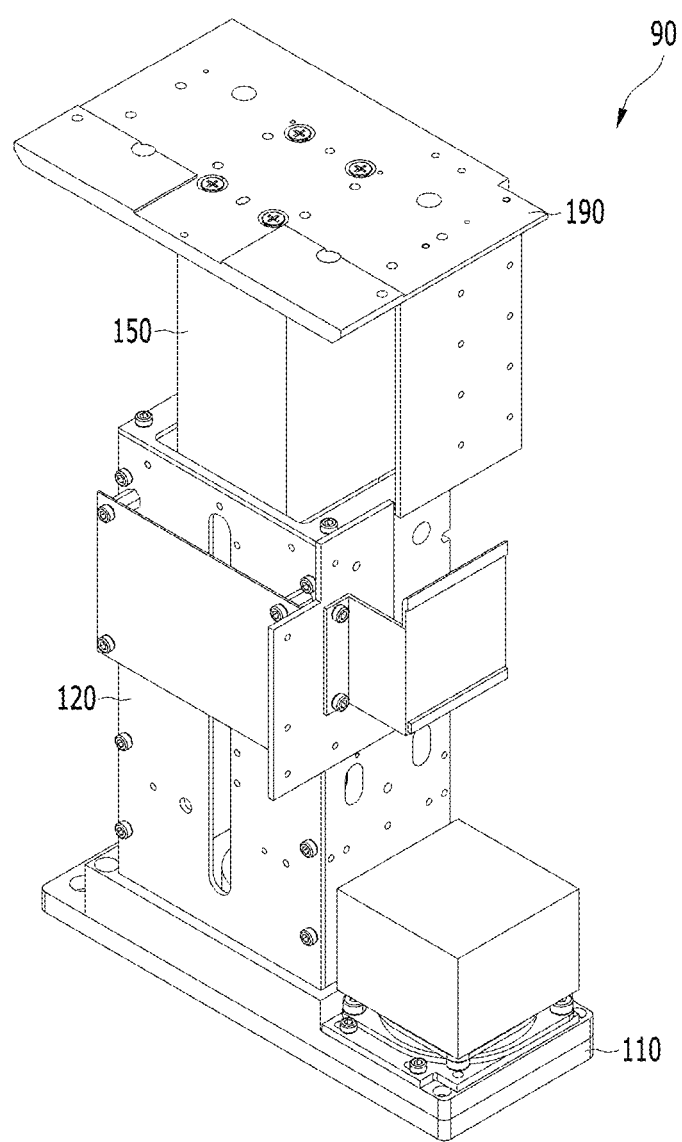
FIG. 1 is a perspective view for illustrating a support module 90 of an up-and-down driving device in accordance with the present invention.

Hereinafter, the present invention will be described in detail with reference to the accompanying drawings.

An up-and-down driving device in accordance with one embodiment of the present invention is an up-and-down driving device configured to allow an up-and-down driving unit 150 to move while supporting the load of an object in a support module 90 in which the up-and-down driving unit 150 is movably inserted into an inner space of a fixed housing 120.

The up-and-down driving device comprises a driving means configured to move the up-and-down driving unit 150 in an up-and-down direction; a fixed-position compression spring main module 100 comprising a fixed-position compression spring 130 having one side fixed to a lower end of the housing 120 and the other side supporting the up-and-down driving unit 150 and mounted in a motion direction of the up-and-down driving unit 150; and a variable-position compression spring supplemental module 200 comprising a variable-position compression spring 250 having one side mounted rotatably to a side of the housing 120 and the other side fastened rotatably to the up-and-down driving unit 150 and configured to rotate while making a predetermined angle with the motion direction of the up-and-down driving unit 150.

Referring to FIG. 1, the up-and-down driving device in accordance with the present invention is configured in its exterior with the support module 90. The support module 90 comprises a base plate 110, the housing 120, the up-and-down driving unit 150, and an upper cap 190. In the support module 90, the up-and-down driving unit 150 and the upper cap 190 move up and down, and an object to be transferred is mounted on the upper cap 190. The direction in which the up-and-down driving unit 150 is reciprocated is described as the vertical direction in one embodiment of the present invention, but may also be an inclined direction making a predetermined angle with the vertical direction.

In one embodiment of the present invention, the driving means comprises a drive motor 101 configured to be supplied with electric power and to rotate, a power transmission means 104, 107, and 115 configured to transmit power from the drive motor 101, a rotary drive shaft 145 configured to receive the power from the drive motor 101 via the power transmission means 104, 107, and 115 and to rotate, and a cylindrical guider 141 mounted to the up-and-down driving unit 150, screw-coupled with the rotary drive shaft 145, and configured to move up and down according to a rotation of the rotary drive shaft 145. Specifically, the base plate 110 is equipped with the power transmission means 104, 107, and 115 configured to transmit the power from the drive motor 101. The power transmission means 104, 107, and 115 may comprise a first pulley 104 coupled to the drive motor 101 and configured to rotate, a second pulley 107 coupled to the rotary drive shaft 145 and configured to rotate, and a power transmission belt 115 coupled to the first pulley 104 and the second pulley 107 and configured to transmit a driving force. The drive motor 101 rotates the rotary drive shaft 145 via the power transmission means 104, 107, and 115.

A cylindrical cushioning elastic member 137 having a through-groove formed therein is formed on an upper surface of the base plate 110. The cushioning elastic member 137 may be formed from an elastic material such as rubber or urethane foam, and may absorb an impact force exerted on the fixed-position compression spring 130.

A rail 165 configured to guide an up-and-down movement direction of the up-and-down driving unit 150 is formed inside the housing 120, and a sliding unit 160 configured to move along the rail 165 is mounted to a side of the up-and-down driving unit 150, so as to guide the up-and-down driving unit 150 to move up and down inside the housing 120.

The upper cap 190 is, for example, in the shape of a rectangular flat plate, and is fixed to an upper end portion of the up-and-down driving unit 150 with fastening means such as bolts and screws.

Figure 2:
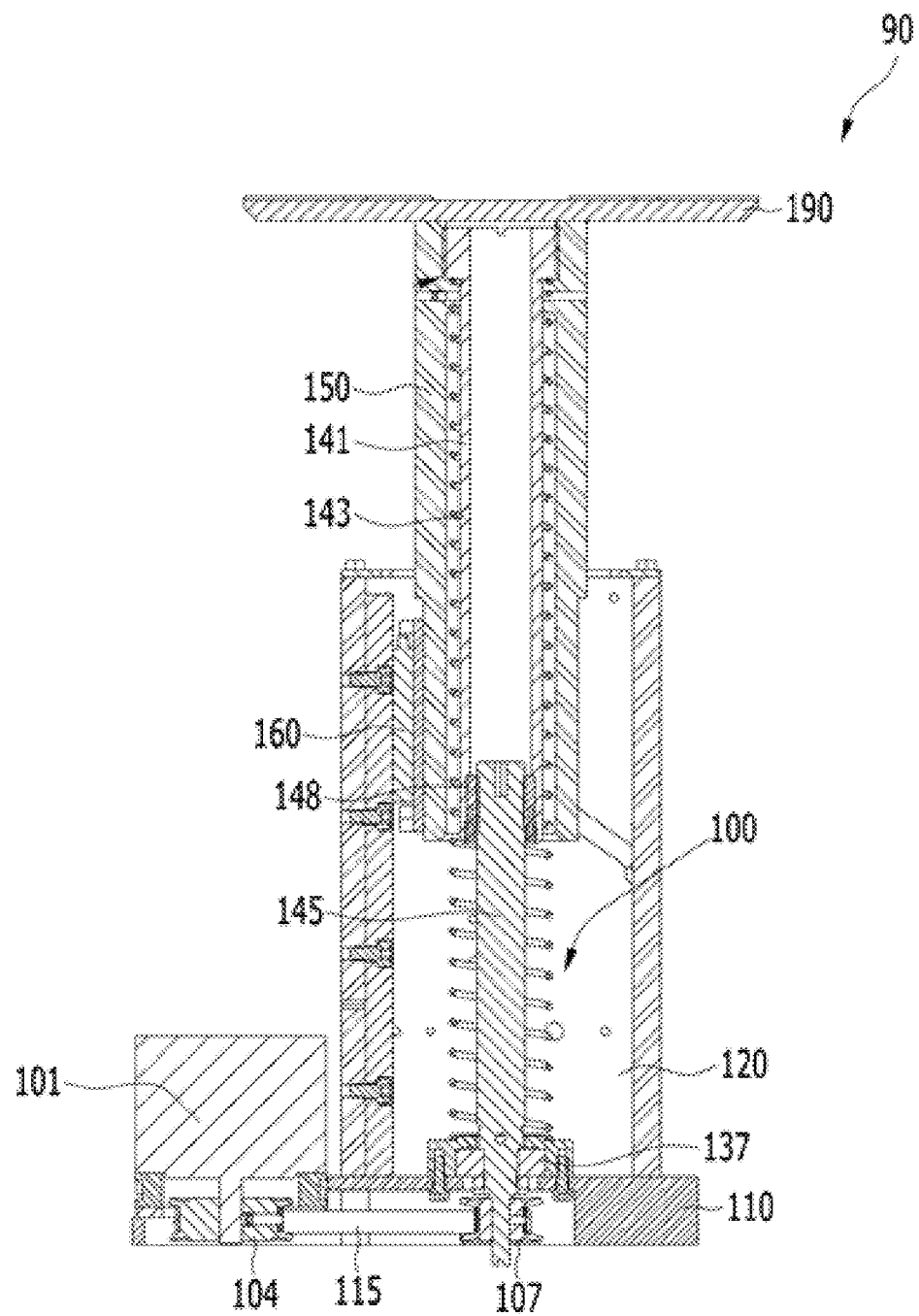
FIG. 2 is a cross-sectional view for illustrating a fixed-position compression spring main module 100 of the up-and-down driving device in accordance with the present invention.

Referring to FIG. 2, in the up-and-down driving device in accordance with the present invention, the driving means further comprises a rotary drive shaft 145 and a cylindrical guider 141. The drive motor 101 is mounted on the upper surface of the base plate 110 and applies power to the rotary drive shaft 145.

The drive motor 101 is supplied with electric power, rotates the rotary drive shaft 145, and moves the up-and-down driving unit 150 in the up-and-down direction. As the drive motor 101, a motor of an appropriate size and performance may be used according to an external load and a place where the up-and-down driving device of the present invention is installed. A threaded joint 148 is formed at one end of the rotary drive shaft 145. The other end of the rotary drive shaft 145 is coupled to the second pulley 107 via the cushioning elastic member 137 of the base plate 110.

The cylindrical guider 141 in a cylindrical shape having a space formed therein is mounted on the inner side of the up-and-down driving unit 150, and a cylindrical guider threaded part 143 is formed on the inner surface of the cylindrical guider 141.

The rotary drive shaft 145 is inserted into the inside of the cylindrical guider 141, and the threaded joint 148 of the rotary drive shaft 145 is screwed to the cylindrical guider threaded part 143 of the cylindrical guider 141. Accordingly, when the rotary drive shaft 145 whose position is fixed rotates forwards or backwards, the cylindrical guider 141 and the up-and-down driving unit 150 is raised or lowered.

A fixed-position compression spring main module 100 is positioned between the housing 120 and the up-and-down driving unit 150. The fixed-position compression spring main module 100 includes a fixed-position compression spring 130 having one side fixed to the lower end of the housing 12 and the other side supporting the up-and-down driving unit 150 from below.

The fixed-position compression spring 130 is mounted in the inner space of the up-and-down driving unit 150, and specifically, is mounted surrounding the outer circumferential surface of the cylindrical guider 141 and the rotary drive shaft 145. One end of the fixed-position compression spring 130 supports the up-and-down driving unit 150, thereby pushing the up-and-down driving unit 150 upward, and the other end is closely fixed to the upper surface of the cushioning elastic member 137 attached to the upper surface of the base plate 110. Specifically, the lower the up-and-down driving unit 150 is positioned, the more the fixed-position compression spring 130 is compressed and the stronger a force with which the fixed-position compression spring 130 pushes the up-and-down driving unit 150 upward becomes, and the higher the up-and-down driving unit 150 is positioned, the less the fixed-position compression spring 130 is compressed and the smaller a force pushing the up-and-down driving unit 150 upward becomes.

Figure 3:
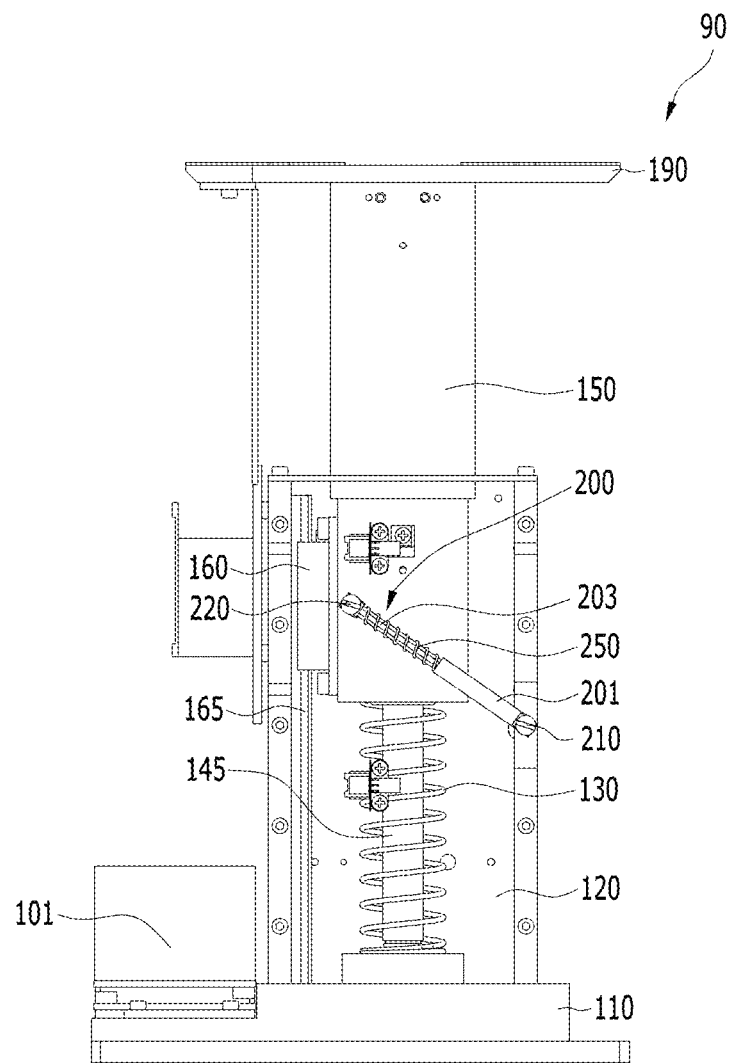
FIG. 3 is a cross-sectional view for illustrating a variable-position compression spring supplemental module 200 of the up-and-down driving device in accordance with the present invention.

Referring to FIG. 3, in the up-and-down driving device in accordance with the present invention, a variable-position compression spring supplemental module 200 is mounted between the housing 120 and the up-and-down driving unit 150.

The variable-position compression spring supplemental module 200 includes at least one spring 250 having one side fixed to a side of the housing 120 and the other side fastened to the up-and-down driving unit 150, and rotatably mounted while making a predetermined angle with the motion direction of the up-and-down driving unit 150. The variable-position compression spring supplemental module 200 includes a cylindrical shaft 201, a circular column shaft 203, and a variable-position compression spring 250.

The cylindrical shaft 201 has a space formed therein and one end mounted on the side of the housing 120 so as to be rotatable around a first rotation shaft 210.

The circular column shaft 203 is configured to be inserted into an inner space of the cylindrical shaft 201, and has one end mounted on the up-and-down driving unit 150 so as to be rotatable around a second rotation shaft 220.

The variable-position compression spring 250 is a variable-position compression spring 250 configured to be inserted into the inner space of the cylindrical shaft 201 and to surround an outer side of the circular column shaft 203, and mounted between the first rotation shaft 210 and the second rotation shaft 220 to change its length by an elastic force.

Figure 4:
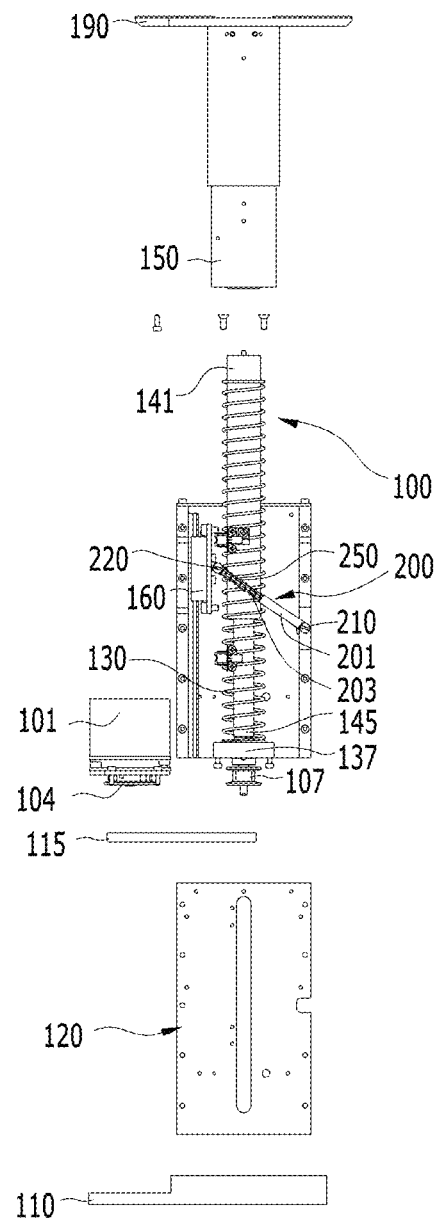
FIG. 4 is an exploded view of the up-and-down driving device in accordance with the present invention.

The operation of the up-and-down driving device in accordance with the present invention will be described with reference to FIG. 4. When the drive motor 101 is supplied with electric power and generates rotational power, the first pulley 104 coupled with the drive motor 101 is rotated, and as a result, the power transmission belt 115 engaged with the first pulley 104 rotates and moves, thereby rotating the second pulley 107.

When the second pulley 107 is rotated, the rotary drive shaft 145 fastened to the second pulley 107 rotates, and the threaded joint 148 formed at one end of the rotary drive shaft 145 is also rotated. Accordingly, the cylindrical guider threaded part 143 screwed with the threaded joint 148 of the rotary drive shaft 145 and the cylindrical guider 141 move in the upward or downward direction. At this time, the rotation direction of the first pulley 104, the power transmission belt 115, the second pulley 107, and the rotary drive shaft 145 may be in a clockwise or counterclockwise direction by controlling the electric current of the power supply supplied to the drive motor 101, and the speed at which the first pulley 104, the power transmission belt 115, the second pulley 107, and the rotary drive shaft 145 rotate may be controlled according to the rotational speed of the drive motor 101 by the intensity of the electric current supplied, thereby changing the moving speed at which the cylindrical guider 141 vertically moves upward or downward.

When the cylindrical guider 141 moves in the upward or downward direction, the up-and-down driving unit 150 and the upper cap 190 coupled to the cylindrical guider 141 are also moved in unison in the upward or downward direction. At this time, since the up-and-down driving unit 150 has one side fastened to the sliding unit 160, the sliding unit 160 will guide the movement in the upward or downward direction of the up-and-down driving unit 150 along the rail 165 formed in the longitudinal direction on the inner surface of the guide space of the housing 120.

At this time, the fixed-position compression spring 130 mounted surrounding the outer circumferential surface of the cylindrical guider 141 and the rotary drive shaft 145 performs an elastic motion of being stretched or compressed depending on the positions of the cylindrical guider 141 and the rotary drive shaft 145. Specifically, the lower the cylindrical guider 141 and the up-and-down driving unit 150 are positioned, the more the fixed-position compression spring 130 is compressed and the stronger a force pushing the up-and-down driving unit 150 upward becomes, and the higher the cylindrical guider 141 and the up-and-down driving unit 150 are positioned, the less the fixed-position compression spring 130 is compressed and the smaller a force pushing the up-and-down driving unit 150 upward becomes.

On the other hand, when the up-and-down driving unit 150 moves in the upward or downward direction, the circular column shaft 203, one end of which is rotatably fastened to the up-and-down driving unit 150, is moved either in the direction of being detached from the cylindrical shaft 201 or in the direction of being inserted, with the one end fitted into the cylindrical shaft 201 fastened rotatably to the housing 120.

Because of this, the variable-position compression spring 250 mounted surrounding the outer circumferential surface of the cylindrical shaft 201 and the circular column shaft 203 performs an elastic motion of being stretched or compressed depending on the positions of the cylindrical shaft 201 and the circular column shaft 203.

At this time, since the cylindrical shaft 201 has one end rotatably fastened by the housing 120 and the first rotation shaft 210, and the circular column shaft 203 is inserted into the inner space of the cylindrical shaft 201 and has one end rotatably fastened by the up-and-down driving unit 150 and the second rotation shaft 220, the rotation angle of the variable-position compression spring supplemental module 200 corresponds to the up-and-down position of the up-and-down driving unit 150. In order for the up-and-down driving unit 150 to move up and down, when the motion direction of the fixed-position compression spring main module 100 is considered as the y-axis, the predetermined angle at which the variable-position compression spring supplemental module 200 is rotated may be within 180 degrees, but is preferably within 30 degrees to 60 degrees, and more preferably 40 degrees to 50 degrees. If the second rotation shaft 220 of the variable-position compression spring supplemental module 200 is located above the first rotation shaft 210, the variable-position compression spring 250 pushes the up-and-down driving unit 150 upward. On the contrary, if the second rotation shaft 220 of the variable-position compression spring supplemental module 200 is located below the first rotation shaft 210, the variable-position compression spring 250 pushes the up-and-down driving unit 150 downward.

Figure 5:
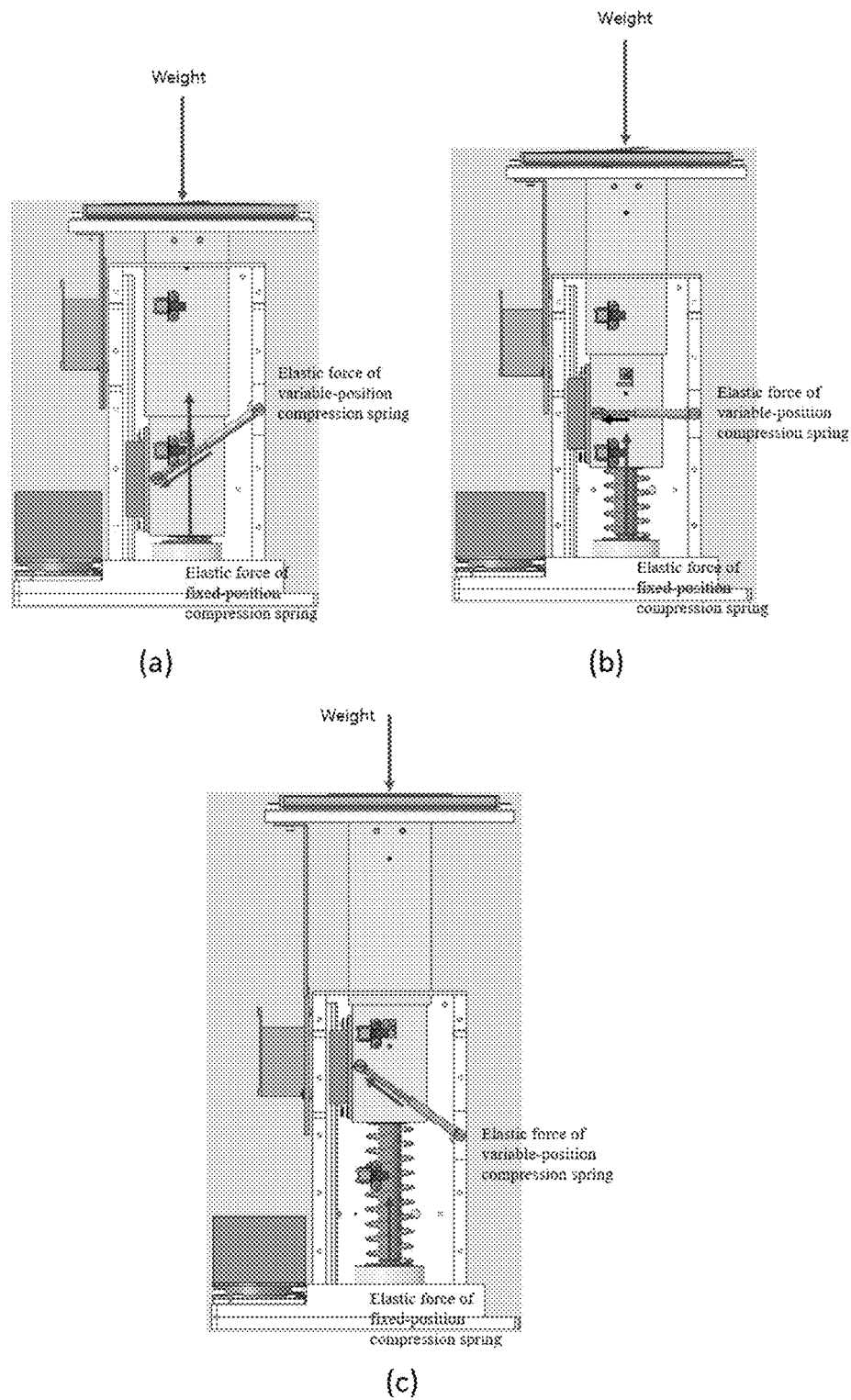
FIG. 5 is a diagram for illustrating the operation of the fixed-position compression spring main module 100 and the variable-position compression spring supplemental module 200 of the up-and-down driving device in accordance with the present invention.

Referring to FIG. 5, FIG. 5 (*a*) shows a state in which the up-and-down driving unit 150 has been moved to the lowest point, FIG. 5 (*b*) shows a state in which the up-and-down driving unit 150 has been moved to an intermediate point, and FIG. 5 (*c*) shows a state in which the up-and-down driving unit 150 has been moved to the highest point.

As shown in FIG. 5 (*a*), as the up-and-down driving unit 150 moves downward and the fixed-position compression spring 130 is compressed more, the elastic force that the fixed-position compression spring 130 pushes the up-and-down driving unit 150 upward increases; however, the variable-position compression spring supplemental module 200 is directed downward, and the variable-position compression spring 250 pushes the up-and-down driving unit 150 downward and accordingly, cancels out in part the force that the fixed-position compression spring 130 pushes the up-and-down driving unit 150 upward. Therefore, the drive motor 101 can move the up-and-down driving unit 150 downward with a smaller force.

As shown in FIG. 5 (*b*), if the up-and-down driving unit 150 is located at an intermediate point and the fixed-position compression spring 130 is compressed to intermediate, the elastic force the fixed-position compression spring 130 applies upward to the up-and-down driving unit 150 becomes intermediate. At this time, the variable-position compression spring 250 of the variable-position compression spring supplemental module 200 is extended to the minimum, and the variable-position compression spring supplemental module 200 is not located in the upper and lower directions and accordingly, does not affect the movement of the up-and-down driving unit 150. Therefore, the force of the drive motor 101 can move the up-and-down driving unit 150, to which the force of the fixed-position compression spring 130 is applied, upward or downward.

As shown in FIG. 5 (c), as the up-and-down driving unit 150 moves upward and the fixed-position compression spring 130 is compressed less, the elastic force that the fixed-position compression spring 130 pushes the up-and-down driving unit 150 upward decreases; however, the variable-position compression spring supplemental module 200 is directed upward, and the variable-position compression spring 250 pushes the up-and-down driving unit 150 upward and accordingly, both the fixed-position compression spring 130 and the variable-position compression spring 250 push the up-and-down driving unit 150 upward. Therefore, the drive motor 101 can move the up-and-down driving unit 150 upward with a smaller force.

Not only in the three cases of FIGS. 5 (a), 5 (b), and 5 (c) described above but also in all sections where the up-and-down driving unit 150 is moved, when the up-and-down driving unit 150 is located in the lower direction, the variable-position compression spring 250 cancels out the increase in the compressive force of the fixed-position compression spring 130, and when the up-and-down driving unit 150 is located in the upper direction, the variable-position compression spring 250 compensates for the decrease in the compressive force of the fixed-position compression spring 130. Therefore, in all sections where the up-and-down driving unit 150 is moved, since the elastic force of the variable-position compression spring 250 is changed in response to the change in the size of the fixed-position compression spring 130 and the degree to which the size of the fixed-position compression spring 130 is changed is compensated, the up-and-down driving unit 150 will be able to stably transfer the object.

According to the up-and-down driving device in accordance with the present invention, it is possible to implement a stable operation of the up-and-down driving device with a combination of the fixed-position compression spring main module 100 and the variable-position compression spring supplemental module 200 when it is necessary to implement the up-and-down movement of an object with the drive motor 101 in a place where space is insufficient.

In addition, it is possible to preclude the drive motor 101 from being overloaded by allowing the elastic force of the variable-position compression spring supplemental module 200 to be automatically changed in response to the position of the fixed-position compression spring main module 100.

Although the present invention has been described by way of limited embodiments and drawings as set forth above, the present invention is not limited to the above embodiments, and those of ordinary skill in the art to which the present invention pertains can make various modifications and variations from such descriptions. Therefore, the spirit of the present invention should be understood only by the claims set forth below, and all equal or equivalent modifications thereof are intended to be within the scope of the spirit of the present invention.

The invention claimed is:

1. An up-and-down driving device, comprising:
a fixed housing (120);
an up-and-down driving unit (150) movably inserted into an inner space of the fixed housing (120);
a driving means configured to move the up-and-down driving unit (150) in an up-and-down direction;
a fixed-position compression spring main module (100) comprising a fixed-position compression spring (130) having one side fixed to a lower end of the fixed housing (120) and the other side supporting the up-and-down driving unit (150) and mounted in a motion direction of the up-and-down driving unit (150);
a variable-position compression spring supplemental module (200) comprising a variable-position compression spring (250) having one side mounted rotatably to a side of the fixed housing (120) and the other side fastened rotatably to the up-and-down driving unit (150) and configured to rotate while making a predetermined angle with the motion direction of the up-and-down driving unit (150);
a rail (165) configured to guide an up-and-down movement direction of the up-and-down driving unit (150), the rail (165) being formed inside the fixed housing (120); and
a sliding unit (160) configured to move along the rail (165), the sliding unit (160) being mounted to a side of the up-and-down driving unit (150) so as to guide the up-and-down driving unit (150) to move up and down inside the fixed housing (120).

2. The up-and-down driving device of claim 1, wherein the driving means comprises:
a drive motor (101) configured to be supplied with electric power and to rotate;
a power transmission means (104), (107), and (115) configured to transmit power from the drive motor (101);
a rotary drive shaft (145) configured to receive the power from the drive motor (101) via the power transmission means (104), (107), and (115) and to rotate; and
a cylindrical guider (141) mounted to the up-and-down driving unit (150), screw-coupled with the rotary drive shaft (145), and configured to move up and down according to a rotation of the rotary drive shaft (145).

3. The up-and-down driving device of claim 1, wherein the lower the up-and-down driving unit (150) is positioned, the more the fixed-position compression spring (130) is compressed and the stronger a force with which the fixed-position compression spring (130) pushes the up-and-down driving unit (150) upward becomes, and the higher the up-and-down driving unit (150) is positioned, the less the fixed-position compression spring (130) is compressed and the smaller a force pushing the up-and-down driving unit (150) upward becomes.

4. The up-and-down driving device of claim 1, wherein the variable-position compression spring supplemental module (200) comprises:
a cylindrical shaft (201) having a space formed therein and one end mounted on the side of the fixed housing (120) so as to be rotatable around a first rotation shaft (210);
a circular column shaft (203) configured to be inserted into an inner space of the cylindrical shaft NON (201), and having one end mounted on the up-and-down driving unit (150) so as to be rotatable around a second rotation shaft (220); and
the variable-position compression spring (250) configured to be inserted into the inner space of the cylindrical shaft (201) and to surround an outer side of the circular column shaft (203), and mounted between the first rotation shaft (210) and the second rotation shaft (220) to change its length by an elastic force.

5. The up-and-down driving device of claim 4, wherein if the second rotation shaft (220) of the variable-position compression spring supplemental module (200) is located above the first rotation shaft (210), the variable-position compression spring (250) pushes the up-and-down driving unit (150) upward, and if the second rotation shaft (220) of the variable-position compression spring supplemental module (200) is located below the first rotation shaft (210), the variable-position compression spring (250) pushes the up-and-down driving unit (150) downward.

6. The up-and-down driving device of claim 1, further comprising a support module (90) for supporting a load of an object.

7. The up-and-down driving device of claim 6, wherein the up-and-down driving unit (150) moves while supporting the support module (90).

* * * * *